(12) United States Patent
Chen (10) Patent No.: US 6,808,344 B2
(45) Date of Patent: Oct. 26, 2004

(54) MULTI-AXIS CARTESIAN GUIDED PARALLEL KINEMATIC MACHINE

(76) Inventor: Jeng-Shyong Chen, No. 64-5, Lin 10, San Hsing Village, Min Hsiung Hsiang, Chiayi Hsien (TW)

( * ) Notice: Subject to any disclaimer, the term of this patent is extended or adjusted under 35 U.S.C. 154(b) by 62 days.

(21) Appl. No.: 10/329,550

(22) Filed: Dec. 27, 2002

(65) Prior Publication Data

US 2004/0126198 A1 Jul. 1, 2004

(51) Int. Cl.[7] .............................. B23C 1/12; B23C 1/00
(52) U.S. Cl. ........................................ 409/201; 409/235
(58) Field of Search .............................. 409/201, 235, 409/204, 211, 216, 190, 191, 206, 228, 229; 901/41; 414/735; 248/631, 654; 408/234; 74/479.01, 480 R, 481, 482, 480 B, 483 R, 483 PB, 483 K, 485, 487, 488, 489, 484 H, 490, 490.01, 490.02, 490.03, 490.04, 490.05, 490.06, 490.07, 490.08, 490.09, 490.1, 490.11, 490.12, 490.13, 490.14, 490.15, 486; 219/69.11

(56) References Cited

U.S. PATENT DOCUMENTS

| | | | | | |
|---|---|---|---|---|---|
| 4,523,882 A | * | 6/1985 | Hengesbach | ................ | 408/234 |
| 5,813,287 A | * | 9/1998 | McMurtry et al. | ........ | 74/490.06 |
| 5,911,888 A | * | 6/1999 | Girardin | ................... | 219/69.11 |
| 6,301,525 B1 | * | 10/2001 | Neumann | .................... | 414/729 |
| 6,428,453 B1 | * | 8/2002 | Hoppe et al. | ................ | 409/235 |
| 6,540,458 B1 | * | 4/2003 | Ponisch | ....................... | 409/201 |
| 6,719,506 B2 | * | 4/2004 | Chang et al. | ................ | 409/201 |
| 2003/0005786 A1 | * | 1/2003 | Stuart et al. | ............. | 74/479.01 |

* cited by examiner

Primary Examiner—A. L. Wellington
Assistant Examiner—Dana Ross
(74) Attorney, Agent, or Firm—Bacon & Thomas, PLLC (57) ABSTRACT

A multi-axis Cartesian guided parallel kinematic machine has a frame, a base platform, a multi-axis Cartesian guiding mechanism assembly, multiple driving strut assemblies and a motion platform. The motion platform is connected to the base platform through the driving strut assemblies and the multi-axis Cartesian guiding mechanism assembly. The multi-axis Cartesian guiding mechanism assembly has multiple linear guiding mechanisms and rotary guiding mechanisms that are in-serial linked and arranged in orthogonal to each other according to the Cartesian coordinate system. The multiple driving strut assemblies are in-parallel connected to the base platform and the motion platform using pivot joints. Each driving strut assembly is a telescoping strut assembly or a sliding strut assembly. When the driving strut assemblies are actuated, the motion platforms can be driven to a desired position in the Cartesian workspace with a controllable platform orientation relative to the frame.

10 Claims, 7 Drawing Sheets

MULTI-AXIS CARTESIAN GUIDED PARALLEL KINEMATIC MACHINE

BACKGROUND OF THE INVENTION

1. Field of the Invention

The present invention relates to a multi-axis parellel kinematic machine for multi-axis positioning or machining, and more particularly to a multi-axis parellel kinematic machine that can be controlled easier and more precisely in the Cartesian coordinate workspace with controllable orientation.

2. Description of Related Art

Figure 10:
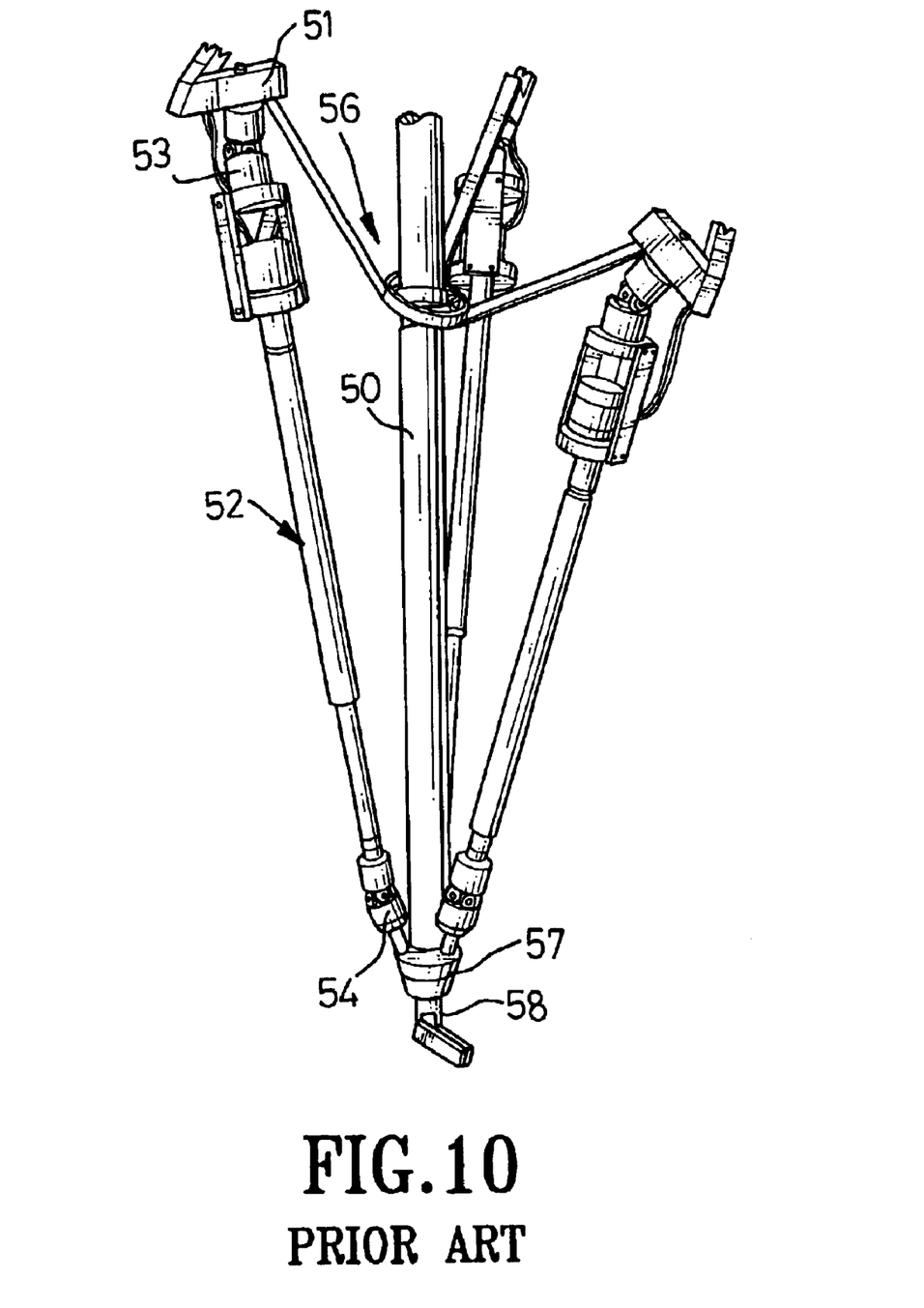
FIG. 10 is a perspective view of a conventional multi-axis parallel kinematic machine in accordance with the prior art.

With reference to FIG. 10, a conventional parallel kinematic machine comprises an extendable arm (50) and three control struts (52). One end of the extendable arm (50) is pivoted by a universal joint (56) that is connected to a stand (51). The opposite end of the extendable arm (50) is fixed to a mobile head (57). A gripping device or a tool head (58) is attached to the mobile head (57). Each control strut (52) is a cylinder with a piston. One end of each control strut (52) is pivotally connected to the stand (51) by a joint (53) such as a ball joint. The other end of each control strut (52) is pivotally connected to the mobile head (57) by another joint (54). When the control struts (52) are retracted or extended, the control struts (52) will rotate relative to the stand (51). The arm (50) will be pushed or pulled by the actuation of the three control struts (52), and the arm (50) will move in rotary relative to the universal joint (56). The gripping device or the tool head (58) can be moved to a desired position by means of the actuation of the control struts (52). Accordingly, the position of the gripping device or the tool head can be controlled.

However, because the position of the arm (50) is confined through the rotations of the joints (56 and 54), the gripping device or tool head (58) cannot be moved in pure linear displacements relative to the stand (51). To reach any point located in the three dimensional workspace, the angles of the gripping device or driving tool relative to the stand (51) are also changed. The conventional machine is usually not used as a three-axis machine with a Cartesian workspace of three linear axes. The conventional machine is more often required the co-working by another two-axis rotary table or rotary head and then becomes a five-axis machine. Control of such a five axis machine requires much expansive and sophisticated software and hardware.

The metrology system to measure and control the position of the tool head (58) is arranged on the arm (50). The Cartesian workspace position of the tool head (58) is by transforming the measurements of the extension and rotations of the arm (50). Due to the Hertz contact deformation, the motion of the universal joint (56) is not precise. The deformation error and sensor resolution error of the universal joint (56) is amplified by the large length of the arm (50). The position accuracy of the gripping device or tool head (58) is limited due to the motion inaccuracy of the universal joint (56) and the length error of the arm (50).

Figure 11:
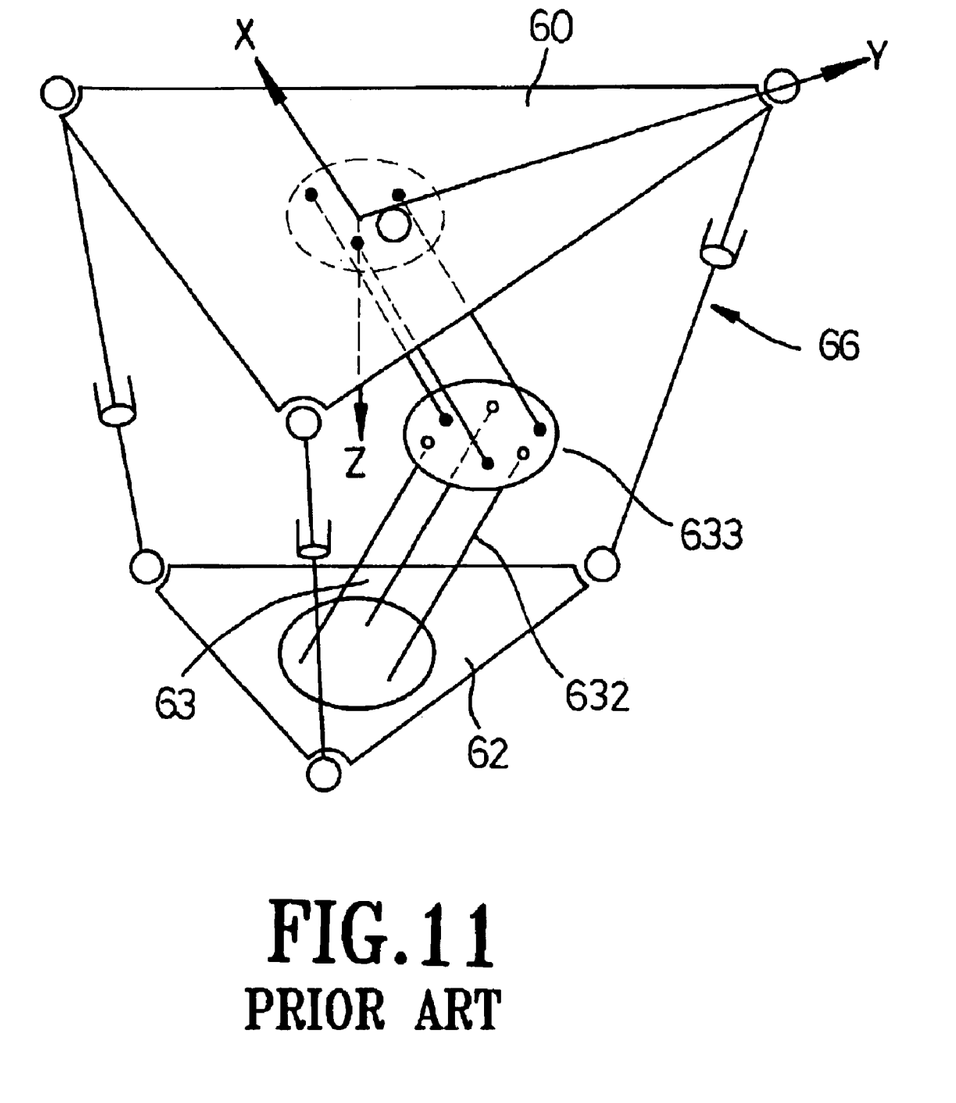
FIG. 11 is a schematic view of another conventional multi-axis parallel kinematic machine in accordance with the prior art.

With reference to FIG. 11, another conventional parallel kinematic machine in accordance with the prior art comprises a base platform (60), a mobile platform (62), a parallelogram guiding mechanism (63), and multiple legs (66). The parallelogram guiding mechanism (63) consists of three upper rods (631), three lower rods (632), and an intermediate platform (633). The three upper rods (631) are in-parallelogram pivoted to the base platform (60) and the intermediate platform (633). The three lower rods (632) are also in-parallelogram pivoted to the mobile platform (62) and the intermediate platform (633). Because of the parallelogram of the three upper rods (631), the intermediate platform (633) is only allowed to move in pure linear displacements relative to the base platform (60). Also, because of the parallelogram connection of the three lower rods (632), the mobile platform (62) is only allowed to move in pure linear displacements relative to the intermediate platform (633). Consequently, the mobile platform (62) is moved in pure linear displacements relative to the base platform (60).

Each leg (66) is telescopically and pivotally connected between the base platform (60) and the mobile platform (62). A gripping device or a tool head (not shown) is attached to the mobile platform (62). The mobile platform (62) is actuated by the three telescoping legs (66). Because the mobile platform (62) is only allowed to move in pure linear displacements relative to the base platform (60), this conventional machine can be used in the three-axis applications with a Cartesian workspace. However, because there are multiple high compliant pivot joints involved in the guiding mechanism (63), the rigidity and motion precision of the parallelogram guiding mechanism (63) is not good. The metrology system to measure and control the position of the mobile platform (62) is arranged on the telescoping legs (66). The Cartesian displacements of the mobile platform (62) are estimated by transforming the measurements of the extension of the leg (66). The Cartesian position accuracy of the mobile platform (62) is limited due to the joint locations errors and initial length errors of the leg (66).

To overcome the shortcomings, the present invention tends to provide an improved parallel kinematic machine to mitigate or obviate the aforementioned problems.

SUMMARY OF THE INVENTION

The main objective of the invention is to provide an improved multi-axis parallel kinematic machine that can be controlled more easily and accurately. The parallel kinematic machine has a motion platform, a base platform, multiple driving struts, and a multi-axis Cartesian guiding mechanism. The multi-axis Cartesian guiding mechanism is purposed for precise guiding the motions of the moving platform in a Cartesian workspace with defined or controllable platform orientation. For a three-axis machine, the motion platform can be moved in a Cartesian workspace with fixed orientation relative to the base platform. For a five-axis machine, the motion platform can be moved in a Cartesian workspace with a controllable platform inclination relative to the base frame. More important, by fully utilizing the elastic averaging design principle, the multi-axis Cartesian guiding mechanism system is also a highly rigid and precise metrology frame that the displacements of the motion platform can be measured and controlled accurately.

Other objects, advantages and novel features of the invention will become more apparent from the following detailed description when taken in conjunction with the accompanying drawings.

DETAILED DESCRIPTION OF PREFERRED EMBODIMENTS

Figure 1:
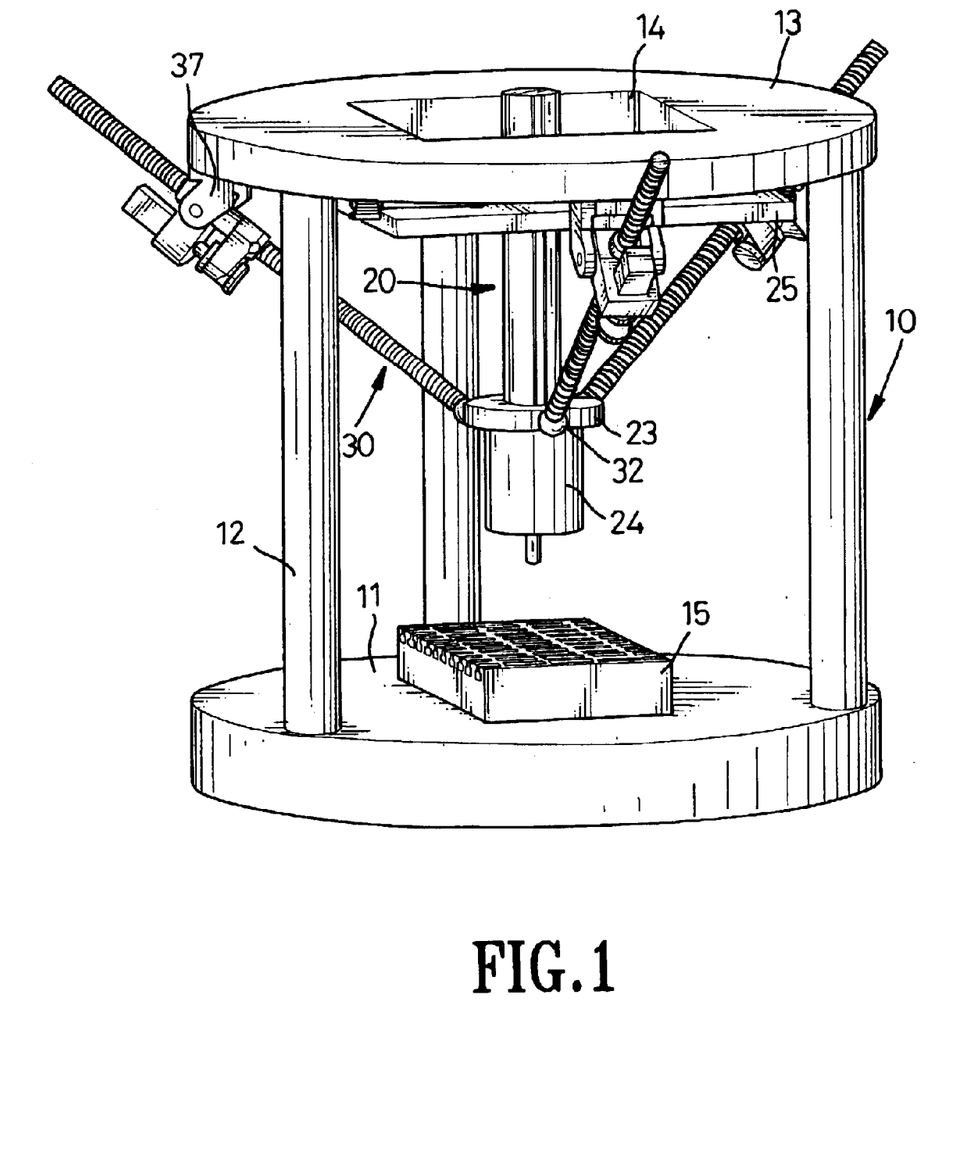
FIG. 1 is a perspective view of a three-axis Cartesian guided parallel kinematic machine in accordance with the present invention.

With reference to FIG. 1, a three-axis Cartesian guided parallel kinematic machine in accordance with the present invention comprises a frame (10), a base platform (13), a motion platform (23), a three-linear-axis Cartesian guiding mechanism assembly (20) and three driving strut assemblies (30). The frame (10) is composed of a bottom base (11) and multiple posts (12). Each post (12) extends upward from the top of the bottom base (11) to support the base platform (13). A working table (15) is attached to the top of the bottom base (11) to hold a worked piece on the working table (15).

Figure 2:
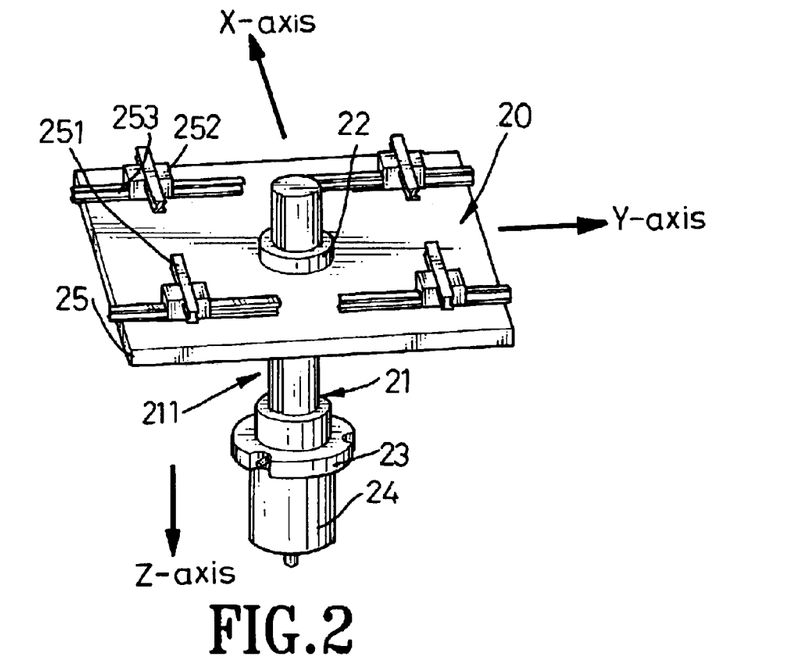
FIG. 2 is a perspective view of an embodiment the three-linear-axis Cartesian guiding mechanism assembly in FIG. 1.

The three-linear-axis Cartesian guiding mechanism assembly (20) is moveably attached to the frame (10). With reference to FIGS. 1 and 2, the three-linear-axis Cartesian guiding mechanism assembly (20) comprises two first-Cartesian-axis guiding tracks (251), four x-y sliding pads (252), two second-Cartesian-axis guiding tracks (253), a x-y motion table (25), a third-Cartesian-axis guiding busing (22), and a z-axis movable arm (21). The x-y motion table (25) is moveably attached to the bottom of the base platform (13). In the first embodiment, two first-Cartesian-axis guiding tracks (251) are in-parallel and firmly secured on the base platform (13) in that the first-Cartesian axis guiding tracks (251) are parallel to the surface of the base platform (13). The two parallel first-Cartesian-axis guiding tracks (251) then define the motion direction of the first Cartesian linear axis said the X-axis. Two x-y sliding pads (252) are movably attached to each first-Cartesian-axis guiding track (251). The top side of each x-y sliding pad has the guiding rolling elements (not shown) in the x direction, while the bottom side has the guiding rolling elements (not shown) in the y-direction. A second-Cartesian-axis guiding track (253) is movably attached to the other side of the two x-y sliding pads (252). Each second-Cartesian-axis guiding track (253) is perpendicular to the first-Cartesian-axis guiding track (251) and also parallel to the surface of the base platform (13). The two parallel second-Cartesian-axis guiding tracks (253) define the motion direction of the second Cartesian axis said the Y-axis. Accordingly, the x-y motion table (25) can be moved relative to the base platform (13) along the first-axis guiding tracks (251) and the second-axis guiding tracks (253). The multi-track and multi-pad design for each guided axis is well known as the elastic averaging design principle in that the load on each guided axis can be shared by the multiple pads with wide spans between them. The wide spans between the sliding pads can increase the bending resistance of the guiding mechanism. The elastic averaging design principle not only increases the rigidity of the guiding mechanism, but also enhances the motion precision of the guiding mechanism by averaging the inaccuracy due to manufacturing and assembling errors. Therefore, with the multi-track and multi-pad elastic averaging design, the x-y motion table (25) can be moved precisely and accurately in a two-dimensional workspace with fixed orientation relative to the frame (10).

There is one through hole defined on the x-y motion table (25). The z-axis movable arm (21) is movably mounted on the through hole on the x-y motion base (25) using a third-Cartesian-axis guiding bushing (22) in that the z-axis movable arm (21) is extendable in the through hole. In the first embodiment, the z-axis movable arm (21) is a shaft guided by the third Cartesian guiding bushing (22). The guiding direction of the third-Cartesian-axis guiding bushing (22) said the z-axis is perpendicular to the x-axis and y-axis defined previously. An open section (14) is also defined on the base platform (13) so the z-axis movable arm (21) can pass through the open section (14). There are keyways (211) designated on the z-axis movable arm (21) and corresponded keys (not shown) designated inside the z-axis guiding bushing (22). Through the keyways (211) and keys, the z-axis movable arm (21) can be only moved in pure translation along the z-axis without any rotation relative to the x-y motion table (25). There are also multiple rolling elements inside the z-axis guiding bushing (22) to enhance the rigidity and motion precision of the z-axis guiding bushing (22) by using the elastic averaging design principle.

A motion platform (23) is firmly attached to one end of the z-axis movable arm (21). The tool driving device (24) is attached to the motion platform (23). A gripping device or a tool head (not shown) is attached to the tool driving device (24) and driven by the driving device (24). In practice, the driving device (24) can be a spindle.

Figure 3:
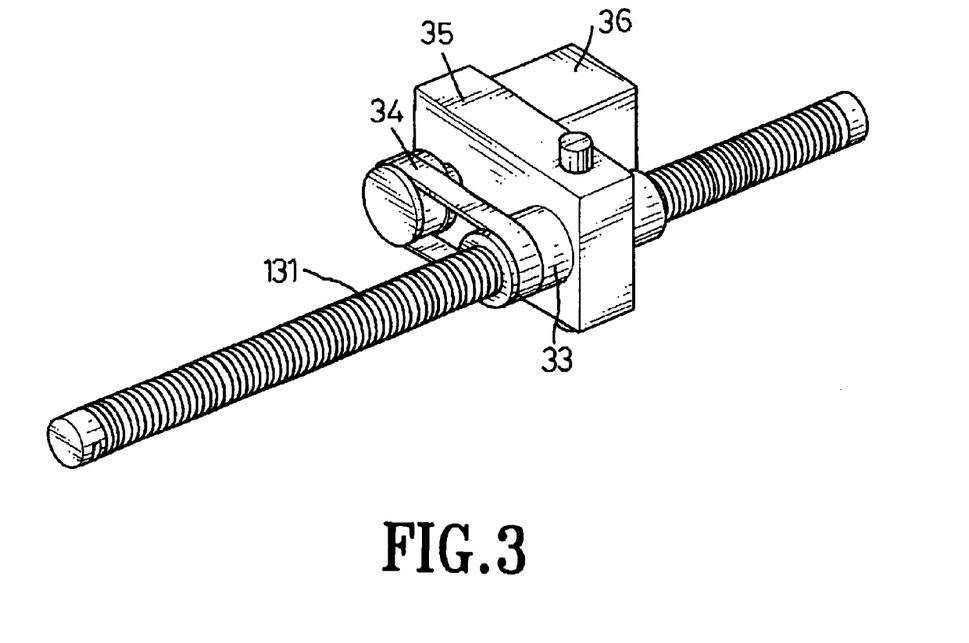
FIG. 3 is a perspective view of an embodiment of the multiple driving strut assemblies in FIG. 1.

One end of each driving strut assembly (30) is connected to the motion platform (23) with a ball or universal joint (32), and the other end is connected to the base platform (13) using a universal connector (37). With reference to FIGS. 1 and 3, the first embodiment of the driving strut assembly (30) is an extendable rod. Each driving strut assembly (30) comprises an outer threaded rod (31), an inner threaded sleeve (33), a belt-transmission device (34), a bearing device (35) and a motor (36). The bearing device (35) is pivotally attached to the universal connector (37). The threaded sleeve (33) is rotationally held by the bearing device (35). The motor (36) is attached to and supported by the bearing device (35). A transmitting device (34) is mounted between the motor (36) drive shaft (not numbered) and the threaded sleeve (33) to rotationally drive the threaded sleeve (33). In practice, the transmitting device (34) is a belt drive assembly. The transmitting device (34) comprises a first pulley on the motor shaft (not numbered), a second pulley on the threaded sleeve (not numbered) and a belt (not numbered). The belt is mounted around the first pulley and the second pulley, such that the sleeve (33) can be rotary relative to the bearing device (35) through the transmission of the transmitting device (34).

The outer thread of the threaded rod (31) engages with the inner thread of the inner threaded sleeve (34). Consequently, when the motor (36) is turned on, the threaded rod (31) will be extensible along the threaded sleeve (33) due to the engagement between the threaded rod (31) and the threaded sleeve (33). One end of the threaded rod (31) is connected to the motion platform (23) by a universal joint (32). The other end of the threaded rod (31) is connected to the base platform (13) through the bearing device (35) that is attached to the base platform using a universal connector (37).

With reference to FIGS. 1 to 3, when the motors (36) in the strut assemblies (30) are turned on, each threaded rod (31) will be rotated and extended relative to the threaded sleeve (33) by the transmission of the transmitting device (34). The threaded rods (31) will push or pull the motion platform (23). The x-y motion table (25) with the z-axis movable arm (21) will be moved relative to the frame (10) along the first-axis tracks (251) and the second-axis tracks (253) with a fixed orientation relative to the frame (10). The z-axis movable arm (21) will also be moved upward or downward relative to the x-y motion table (25) through the third-axis guiding bushing (22) with a fixed orientation relative to the x-y motion table (25). Consequently, the driving device (24) with the gripping device or the tool head attached to the motion platform (23) can be moved to a desired position in a Cartesian workspace with a fixed orientation relative to the frame (10).

Figure 4:
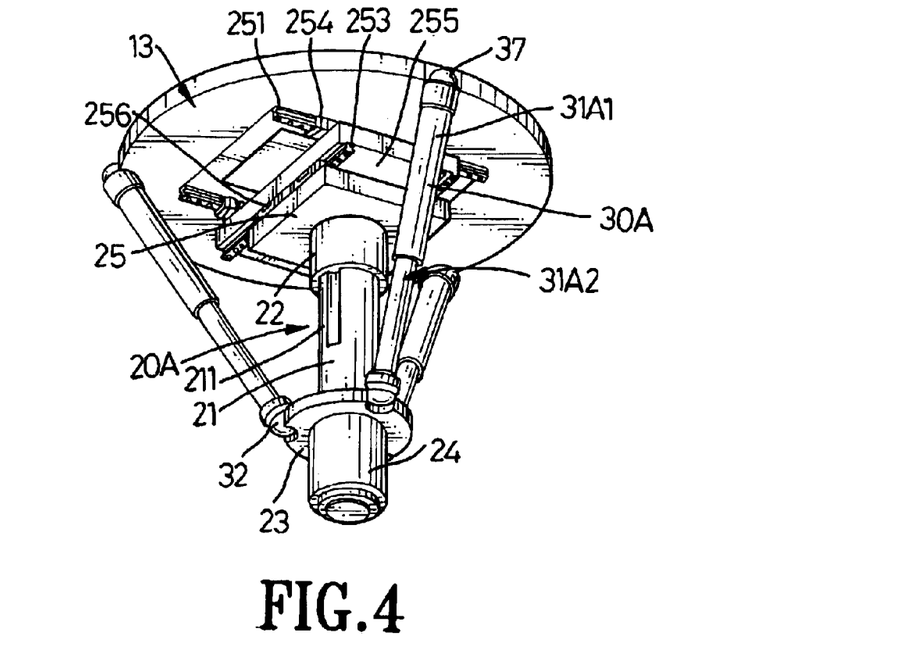
FIG. 4 is a perspective view of a second embodiment of the three-axis Cartesian guided parallel kinematic machine in accordance with the present invention.

With reference to FIG. 4, a second embodiment of the three-axis Cartesian guided parallel kinematic machine comprises a base platform (13), a three-linear-axis Cartesian guiding mechanism assembly (20A), three driving strut assemblies (30A), and a motion platform (23). The three-linear-axis Cartesian guiding mechanism assembly (20A) comprises two first-Cartesian-axis guiding tracks (251), four first-axis sliding pads (254), an x-axis slide (255), two second-Cartesian-axis guiding tracks (253), four second-axis sliding pads (256), an x-y motion table (25), a third-Cartesian-axis guiding busing (22), and a z-axis movable arm (21). In the second embodiment, two first-axis guiding tracks (251) are in-parallel and firmly attached to the base platform (13). Two first-axis sliding pads (254) are movably attached to each first-axis guiding track (251). An x-axis slide (255) is attached firmly on top to the four first-axis sliding pads (254). Two parallel second-axis guiding tracks (253) are mounted firmly on top to the x-axis slide (255) and perpendicular to the first-axis guiding tracks (251). Two second-axis sliding pads (256) are movably attached to each second-axis guiding track (253). An x-y motion table (25) is attached firmly on top to the four second-axis sliding pads (256). Each driving strut assembly (30A) is a telescoping strut consisting of a hollow tube (31A1), a rod (31A2) and a driving mechanism (not shown) inside the hollow tube (31A1). In practice, the driving mechanism can be a cylinder or a ballscrew-but mechanism. When the driving mechanism is actuated, the rod (31A2) will be extensible relative to the hollow tube (31A2). The end on the hollow tube (31A1) is connected to the base platform (13) using a universal connector (37). The end of the rod (31 A2) is connected to the motion platform using a ball joint (32) if the rod (31A2) is not rotary relative to the hollow tube (31A1), or using a universal joint (32) if the rod (31A2) is rotary relative to the hollow tube (31A1).

Figure 5:
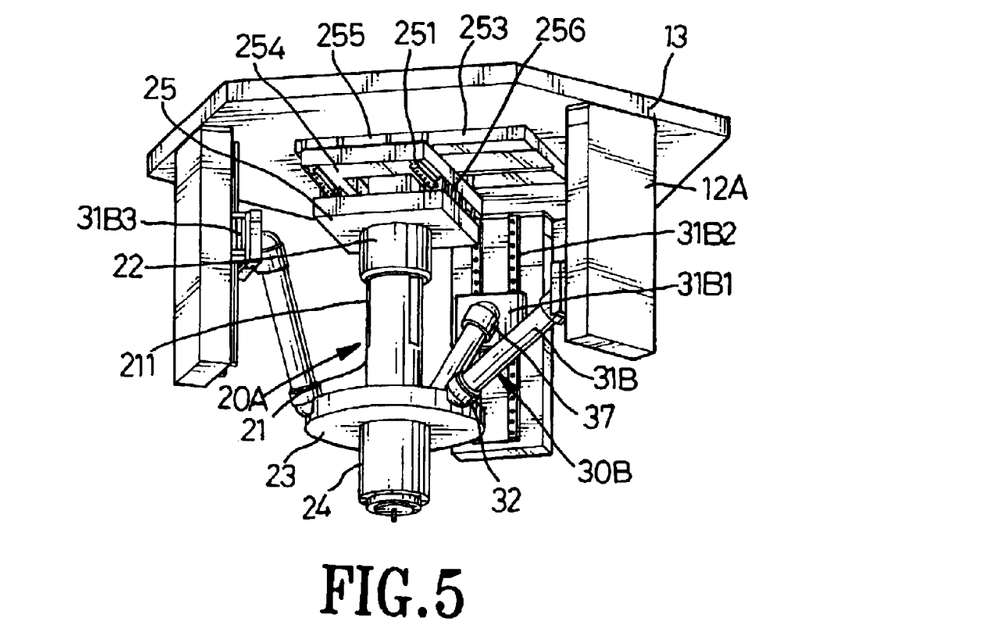
FIG. 5 is a perspective view of a third embodiment of the three-axis Cartesian guided parallel kinematic machine in accordance with the present invention.

With reference to the FIG. 5, a third embodiment of the three-axis Cartesian guided parallel kinematic machine comprises a base platform (13), a three-linear-axis Cartesian guiding mechanism assembly (20A), three driving strut assemblies (30B), and a motion platform (23). Each driving strut assembly (30B) is a sliding leg comprising of a fixed length rod (31B), a universal joint (37), a ball joint (32), a motion slide (31B1), four sliding pads (31B2), and two guiding tracks (31B3). One end of the rod (31B) is pivotally mounted to the motion platform (23) by a ball joint (32). The opposite end of the rod (31) is pivotally connected to the motion slide (31B1) using a universal joint (37). The motion direction of the motion slide (31B1) is defined by two parallel guiding tracks (31B2) firmly mounted on the post (12A). Four sliding pads (31B3) are used to connect the motion slide (31B1) to the guiding tracks (31B2).

When the motion slides (31B1) of the driving strut assemblies (30B) are actuated to move along the guiding tracks (31B2), the motion platform (23) will be moved in a Cartesian workspace with a fixed orientation relative to the base platform (13). In practice, the actuator to drive the motion slide (31B1) can be a ballscrew-nut drive mechanism or a linear motor driving mechanism.

Figure 6:
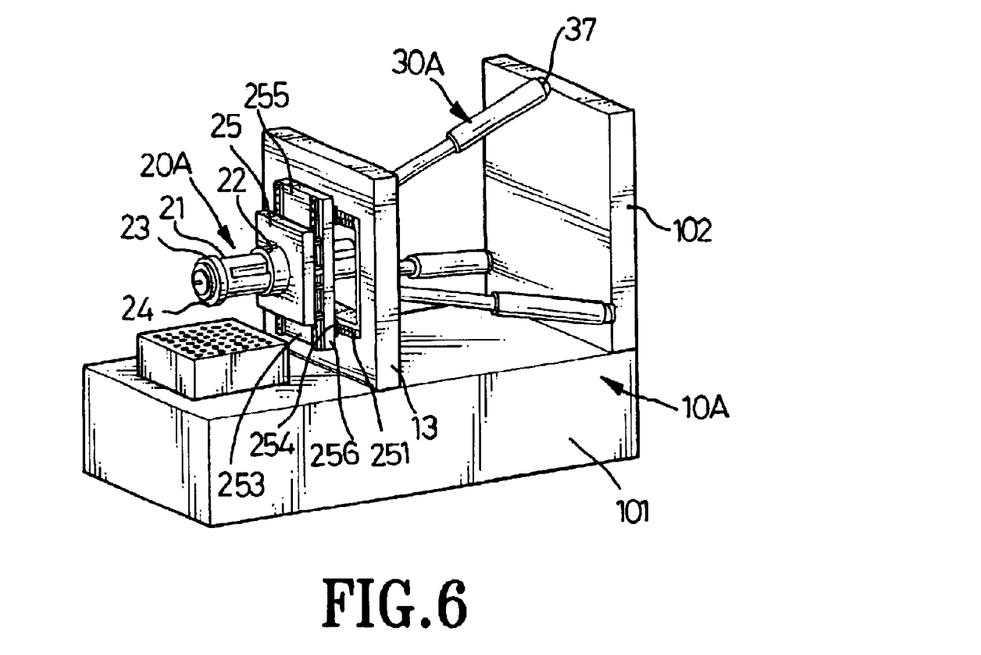
FIGS. 6 and 7 are the two perspective views of a fourth embodiment of the three-axis Cartesian guided parallel kinematic machine in accordance with the present invention.
Figure 7:
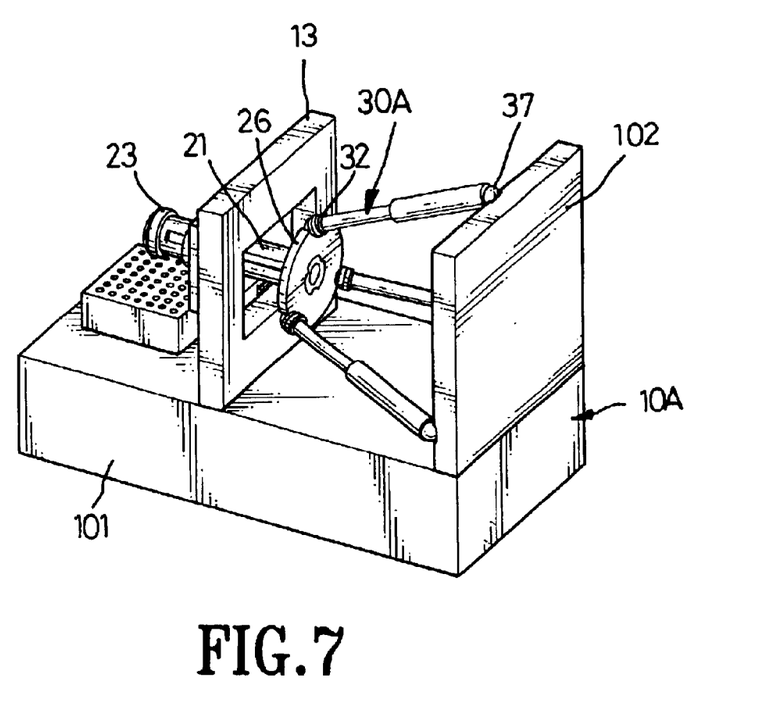

With reference to the FIGS. 6 and 7, a fourth embodiment of the three-axis parallel kinematic machine comprises a frame (10A), a base platform (13), a three-linear-axis Cartesian guiding mechanism assembly (20A), three driving strut assemblies (30A), a motion platform (23), and a plate (26). The frame (10A) is composed of a bottom base (101) and a wall (102). The base platform (13) is in-horizontal mounted to and supported by the frame (10A). The three-linear-axis Cartesian guiding mechanism assembly (20A) is attached to the base platform (13) in that the first-axis guiding tracks (251) is parallel to the surface of the base platform (13). A motion platform (23) is mounted firmly to one end of the z-axis movable arm (21), while a plate (26) is mounted firmly to the opposite end of the z-axis movable arm (21). One end of each driving strut assembly (30A) is connected to the plate (26) with a ball or universal joint (32). The other end of each driving strut assembly (30A) is connected to the wall (102) of the frame (10) using a universal connector (37). When the driving strut assemblies (30A) are actuated, the motion platform (23) will be moved in a Cartesian workspace with a fixed orientation relative to the frame (10A).

Figure 8:
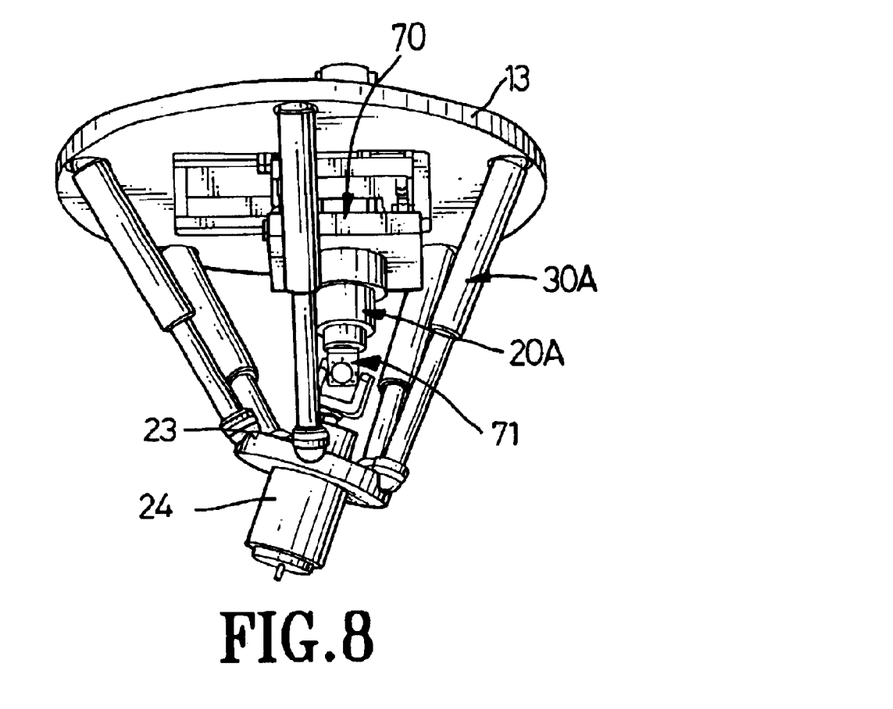
FIG. 8 is a perspective view of an embodiment of a five-axis Cartesian guided parallel kinematic machine in accordance with the present invention.
Figure 9:
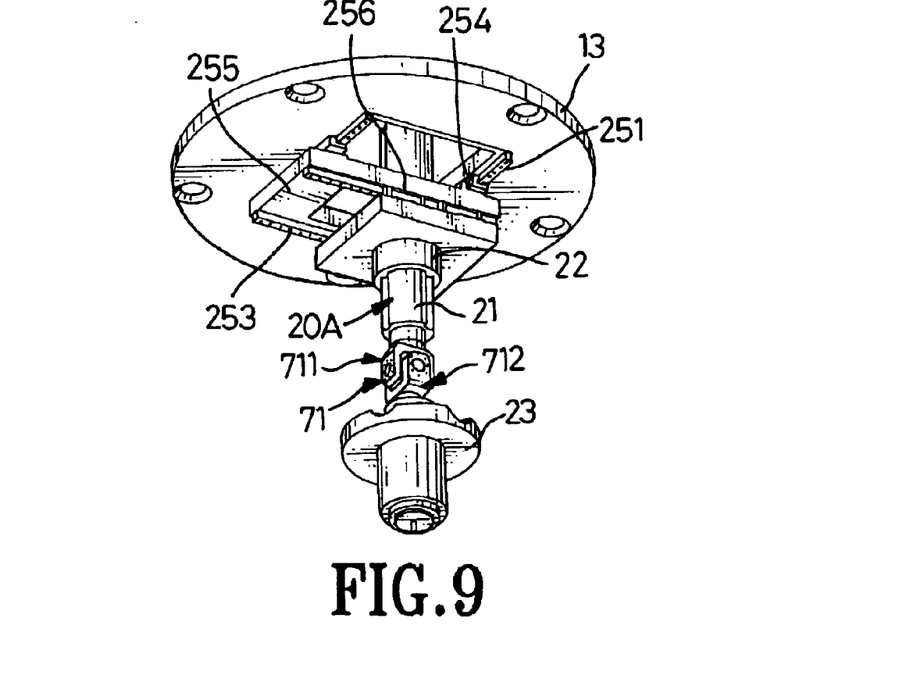
FIG. 9 is a perspective view of an embodiment the five-axis Cartesian guiding mechanism assembly in FIG. 8.

With reference to the FIG. 8, an embodiment of the five-axis parallel kinematic machine comprises a base platform (13), a five-axis Cartesian guiding mechanism assembly (70), five driving strut assemblies (30A), and a motion platform (23). With reference to the FIG. 9, the five-axis Cartesian guiding mechanism assembly (70) comprises the previously described three-linear-axis Cartesian guiding mechanism assembly (20A) and one universal joint (71). The universal joint (71) has two orthogonal rotary axes. The first bracket (711) of the universal joint (71) is firmly mounted to the z-axis movable arm (21) in that the first rotary axis of the universal joint (71) is series-linked and arranged in orthogonal to the third Cartesian axis of the three-linear-axis Cartesian guiding mechanism assembly (20A). The second bracket (712) of the universal joint (71) is firmly connected to the motion platform (23) in that the second rotary axis of universal joint (71) is parallel to the surface of the motion platform (23). With this added universal joint (71), the orientation of the motion platform (23) will be allowed to be inclined relative to the base platform (13). When the five driving strut assemblies are actuated, the motion platform (23) will be moved to a desired point in a Cartesian workspace with a controllable inclination relative to the base platform (13).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A three-axis Cartesian guided parallel kinematic mechanism comprising;
   a frame;
   a base platform having a surface and mounted on and supported by the frame;
   a three-linear-axis Cartesian guiding mechanism assembly attached to the base platform and comprising;
      an x-y motion table having a guided motion plane and attached to the base platform in that the guided motion plane of the x-y motion table is parallel to the surface of the base platform surface;
      an open section defined on the x-y motion table; and
      a Cartesian z-axis movable arm having a guided z-axis motion and attached to the open section on the x-y motion table in that the guided z-axis motion of the z-axis movable arm is orthogonal to the guided motion plane of the x-y motion table;
   a motion platform firmly mounted on the z-axis movable arm;
   a tool head mounted on the motion platform; and
   three driving strut assemblies connected to the base platform at one end and to the motion platform at other end, and each driving strut assembly having:
      a telescoping mechanism to change the strut length;
   whereby when the telescoping mechanisms of the driving struts are actuated, the motion platform can be driven to a desired position in Cartesian workspace defined by the three-linear-axis Cartesian guiding mechanism assembly with a fixed orientation relative to the base platform.

2. The three-axis parallel kinematic machine as claimed in claim 1, wherein an open space is defined on the base platform in that the z-axis movable arm is extendable through the open section of the base platform.

3. The three-axis Cartesian guided parallel kinematic machine as claimed in claim 1, wherein the x-y motion table comprises:
   multiple first-Cartesian-axis tracks having a first-axis guiding track and attached to the base platform in that the first-axis guiding track is parallel to the base platform surface;
   multiple x-y sliding pads movable mounted to the first-axis guiding tracks;
   multiple second-Cartesian-axis guiding tracks having a second-axis guiding track and attached to the x-y sliding pads in that the second-axis guiding track is perpendicular to the first-axis guiding track and parallel to the base platform surface; and
   a motion table firmly attached to the second-axis guiding tracks;
   whereby the motion table can be moved in a Cartesian two-dimensional workspace defined by the first-axis and second-axis guiding tracks with a fixed orientation relative to the base platform.

4. The three-axis Cartesian guided parallel kinematic machine as claimed in claim 1, wherein the Cartesian z-axis movable arm comprising:
   a Cartesian z-axis guiding bushing mounted on the open section of the x-y motion table;
   a z-axis movable arm having a guided motion direction and movably attached to z-axis guiding bushing in that the guided motion direction of the z-axis movable arm is orthogonal to the motion plane of the x-y motion table; and
   keys and keyways respectively designed on the z-axis guiding bushing and z-axis movable arm to avoid any relative rotation between the bushing and the arm;
   whereby the z-axis movable arm can be moved in a Cartesian three-dimension workspace with a fixed orientation relative to the base platform.

5. The three-axis Cartesian guided parallel kinematic machine as claimed in claim 1, wherein each driving strut assembly is an extensible threaded rod, a sleeve assembly driven by a motor and a belt-pulley device;
   whereby when the motor is turned on, the threaded rod will push or pull the moving platform to a desired position.

6. The three-axis parallel kinematic machine as claimed in claim 1, wherein the x-y motion table comprising:
   mulitple first-axis guiding tracks having a first-axis guiding direction and firmly attached to base platform in that the first-axis guiding direction is parallel to the base platform surface;
   mulitple first-axis sliding pads slidably attached to the first-axis guiding tracks;
   a first-axis slide attached firmly on top to first-axis sliding pads;
   multiple second-axis tracks having a second-axis guiding direction and mounted on top of the first-axis sliding pads in that the second-axis guiding direction is perpendicular to the first-axis guiding direction and parallel to the base platform surface;
   multiple second-axis sliding pads movably attached second-axis guiding tracks; and
   a motion table firmly mounted to the top second-axis sliding pads,
   whereby the motion table can be moved in a Cartesian two-dimensional workspace with a fixed orientation relative to the base platform.

7. The three-axis Cartesian guided parallel kinematic machine as claimed in claim 1, wherein each driving strut assembly is a telescoping strut;
   one end of the telescoping strut is connected to the base platform with a universal joint and the other end of the telescoping strut is connected to the motion platform with a ball joint.

8. The three driving strut assemblies as claimed in claim 1, each driving strut assembly is a sliding strut. The sliding strut has a fixed length rod pivoted to the motion platform using a ball joint and movably attached to the base platform using a motion slide.

9. The three-axis Cartesian guided parallel kinematic machine as claimed in claim 1, wherein the z-axis movable arm has the driving strut assemblies arranged at the tail end of the z-axis movable arm.

10. The three-axis Cartesian guided parallel kinematic machine as claimed in claim 1 further comprising a sliding mechanism connected to the driving strut assemblies to move the pivoted position on the base platform, whereby when the sliding mechanisms of the driving struts are actuated, the driving strut assemblies will drive the moving platform to a desired position in the Cartesian workspace with a controllable platform inclination relative to the frame.

* * * * *